UNITED STATES PATENT OFFICE.

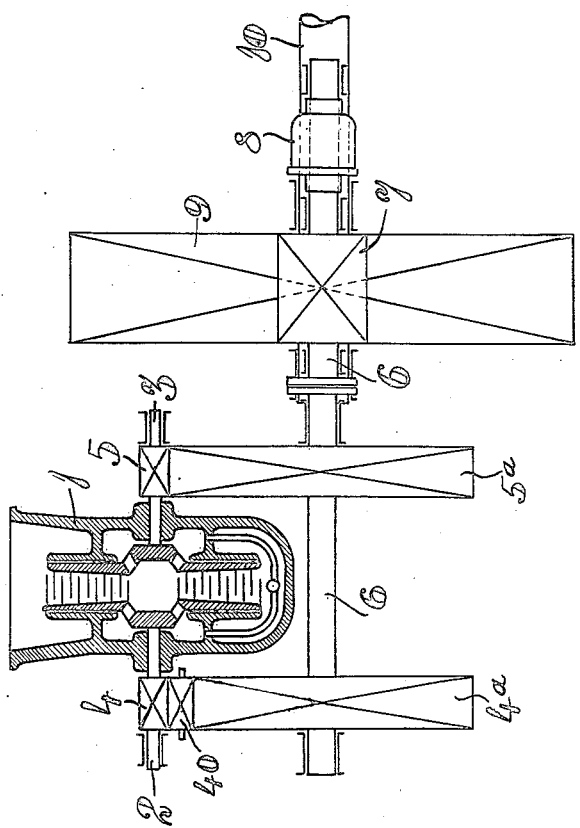

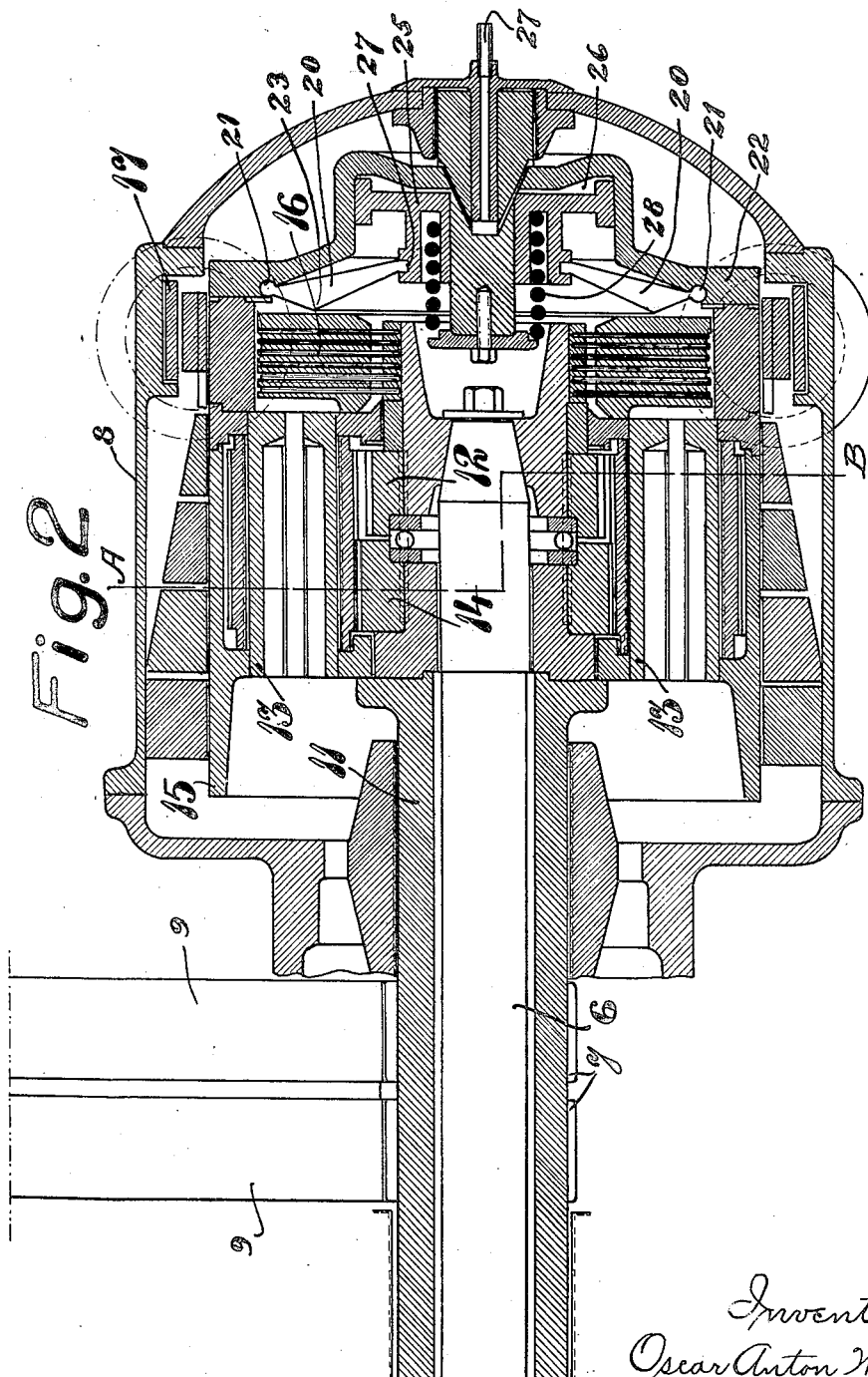

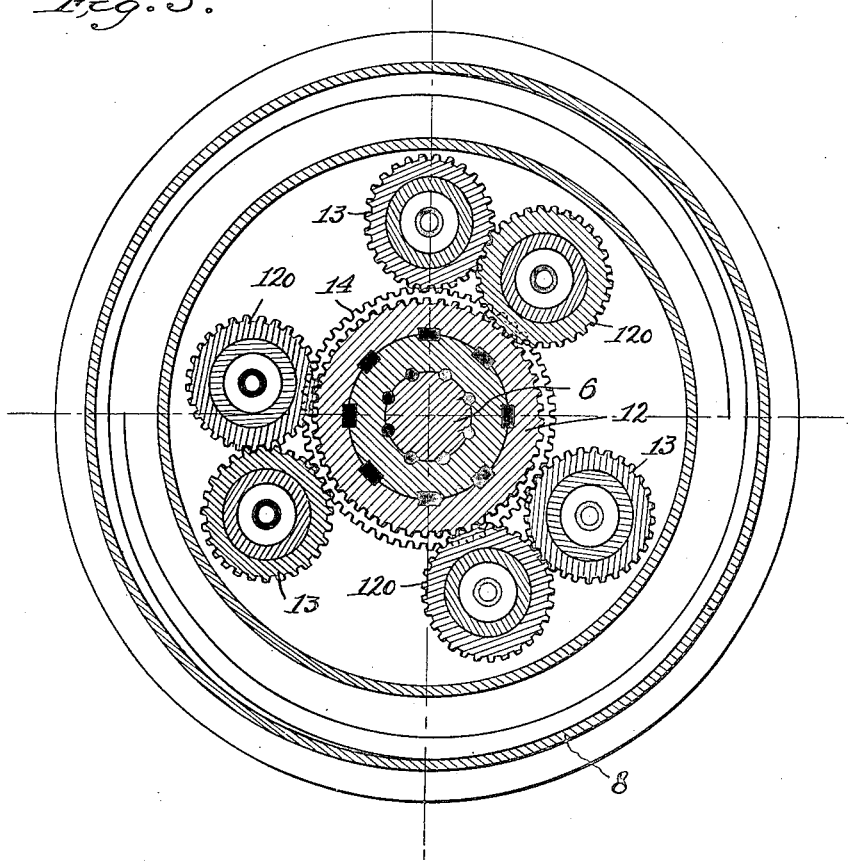

OSCAR ANTON WIBERG, OF FINSPONG, SWEDEN.

POWER-TRANSMISSION DEVICE.

1,379,498.	Specification of Letters Patent.	Patented May 24, 1921.

Application filed April 8, 1920. Serial No. 372,312.

*To all whom it may concern:*

Be it known that I, OSCAR ANTON WIBERG, a citizen of the Kingdom of Sweden, residing at Finspong, Sweden, have invented new and useful Improvements in Power-Transmission Devices, of which the following is a specification.

This invention relates to power transmission devices of the kind including a reversing gear, and particularly to power transmission devices of the type used in connection with marine turbine machines.

The essential feature of the invention consists in this, that the reversing gear is mounted at the ends of two shafts facing in the same direction, one of said shafts concentrically surrounding the other. By this arrangement a considerable reduction of the length of the machine plant may be obtained, furthermore, the reversing gear may be made more readily accessible for inspection and repair than is the case when the reversing gear is interposed between two shafts lying in alinement.

In the accompanying drawing,

Figure 1 is a diagrammatic view, partly in section, of a turbine plant including a power transmission device according to this invention.

Fig. 2 is an axial section through the reversing gear proper.

Fig. 3 is a cross section taken on the line A—B of Fig. 2.

With reference to the drawing, the numeral 1 indicates the turbine, which is assumed to consist of a radial turbine having two wheels rotating in opposite directions. The turbine, however, may be of any other appropriate type. The turbine shafts 2, 3, rotating in opposite directions are connected to an intermediate shaft 6, by means of toothed gears 4, 4ª and 5, 5ª, one of which includes an intermediate wheel 40, for the purpose of causing the wheel 4ª to rotate in the same direction as wheel 5ª. The said shaft 6 extends freely through the hollow shaft or hub 11 of a pinion 7 and ends at a certain distance beyond said hub. This end of the shaft 6 carries a reversing mechanism indicated by 8 in Fig. 1, connecting the shaft 6 to the hub of the pinion 7 rotatably mounted on the shaft 6. The pinion 7 engages a larger toothed wheel 9 attached to the driven shaft 10, as for instance, the propeller shaft.

The construction and arrangement of the reversing mechanism is more clearly illustrated in Figs. 2 and 3. Attached to the end of the inner shaft 6 is a toothed wheel 12 meshing with intermediate wheels 120, which in turn engage in toothed wheels 13. Said toothed wheels 13 have an axial length greater than that of the wheels 120 and engage in a toothed wheel 14 rigidly attached to the end of the hollow shaft or hub 11. The toothed wheels 120 and 13 are mounted with their shafts in a rotatable drum 15. Interposed between said drum 15 and the toothed wheel 12 is a laminated friction coupling 16, and mounted between the drum 15 and an outer stationary drum 8 is a disengaging band coupling or brake 17. The said laminated friction coupling is controlled by bell-crank levers 20 mounted with their one end at 21 in a stationary member 22 and bearing between their ends against the coupling 16 at 23. The opposite ends of said bell-crank levers engage in an annular recess 24 formed in the outer surface of a piston 25 which may be operated to press the bell crank levers against the coupling 16 by means of fluid under pressure introduced into the chamber 26 through the inlet 27, the said piston being moved by a spring 28 to release the coupling 16 upon the cessation of the fluid pressure.

The band coupling or brake 17 is operated in any well known manner which need not be described in detail.

With the coupling 16 engaged and the brake 17 disengaged, the toothed wheel 12 is rigidly coupled to the drum 15 carrying the shafts of the wheels 120 and 13. The wheels 120 and 13 are thereby caused to move as a whole with the wheel 12 and the drum 15, without rotating about their own axes. The mechanism will thus operate as a positive clutch between the shafts 6 and 11, transmitting a non-reversed motion from the shaft 6 to the shaft 11. With the brake 17 engaged and the coupling 16 disengaged, the drum 15 is connected to the stationary drum 8, and is thereby prevented from moving. In this case the wheels 120 and 13 are caused to revolve about their own axes, and will thereby transmit a reversed movement from the shaft 6 to the shaft 11, as will readily be seen from an inspection of Fig. 3.

I claim—

1. In a device of the kind described, the combination with a rotary shaft, of another rotary shaft, tubular in shape and surrounding the said first mentioned shaft, a system of sun and planet wheels between said shafts, a rotary drum surrounding said sun and planet wheels and carrying the planet wheels, a stationary drum, surrounding said rotary drum, means for locking the rotary drum to the stationary drum, and means for locking the rotary drum to one of said shafts, substantially as described.

2. In a device of the kind described, the combination with a rotary shaft, of another rotary shaft, tubular in shape and surrounding said first-mentioned shafts, a system of sun and planet wheels between said shaft, a rotary drum surrounding said sun and planet wheels and having the planet wheels mounted in it, a stationary drum, surrounding said rotary drum, a hydraulically operated laminated friction coupling between one of said shafts and said rotary drum, and a disengaging band coupling between said rotary drum and said stationary drum, substantially as described.

In testimony whereof I have signed my name.

OSCAR ANTON WIBERG.